(12) United States Patent
Pintauro et al.

(10) Patent No.: US 12,266,787 B2
(45) Date of Patent: Apr. 1, 2025

(54) COMPOSITE FIBER ELECTRODES AND APPLICATIONS OF SAME

(71) Applicant: VANDERBILT UNIVERSITY, Nashville, TN (US)

(72) Inventors: Peter N. Pintauro, Brentwood, TN (US); Ryszard N. Wycisk, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 413 days.

(21) Appl. No.: 17/341,487

(22) Filed: Jun. 8, 2021

(65) Prior Publication Data

US 2021/0384493 A1    Dec. 9, 2021

Related U.S. Application Data

(60) Provisional application No. 63/035,918, filed on Jun. 8, 2020.

(51) Int. Cl.
*H01M 4/36*     (2006.01)
*D01D 5/00*     (2006.01)
*D06M 11/74*    (2006.01)
*D06M 11/77*    (2006.01)
*H01M 4/04*     (2006.01)
(Continued)

(52) U.S. Cl.
CPC .......... *H01M 4/366* (2013.01); *D01D 5/0007* (2013.01); *D06M 11/74* (2013.01); *D06M 11/77* (2013.01); *H01M 4/0419* (2013.01); *H01M 4/386* (2013.01); *H01M 4/623* (2013.01); *H01M 4/625* (2013.01); *D06M 2101/28* (2013.01); *D10B 2321/08* (2013.01);
(Continued)

(58) Field of Classification Search
CPC ...... H01M 4/366; H01M 4/364; H01M 4/362; H01M 4/0419; H01M 4/386; H01M 4/623; H01M 4/625; H01M 2004/021; D01D 5/0007; D06M 11/74; D06M 11/77; D06M 2101/28; D10B 2321/08; D10B 2321/10; D10B 2401/10
See application file for complete search history.

(56) References Cited

U.S. PATENT DOCUMENTS

2017/0250431 A1*  8/2017  Pintauro ............. H01M 4/8605
2019/0198837 A1*  6/2019  Yushin ................. H01M 50/46
(Continued)

FOREIGN PATENT DOCUMENTS

CN      109860630 A      6/2019
JP      2018181508 A     11/2018

OTHER PUBLICATIONS

Korean Intellectual Property Office (ISR/KR), "International Search Report for PCT/US2021/061967", Korea, Mar. 24, 2022.

*Primary Examiner* — Raymond Alejandro
(74) *Attorney, Agent, or Firm* — Troutman Pepper Locke; Tim Tingkang Xia, Esq.

(57) ABSTRACT

A composite electrode includes two or more types of fibers forming a fiber network, comprising at least a first type of fibers and a second type of fibers. The first type of fibers comprises a first polymer and a first type of particles. The second type of fibers comprises a second polymer and a second type of particles. The second polymer is same as or different from the first polymer. The second type of particles are same as or different from the first type of particles.

21 Claims, 9 Drawing Sheets

(51) Int. Cl.
  *H01M 4/38* (2006.01)
  *H01M 4/62* (2006.01)
  *D06M 101/28* (2006.01)
  *H01M 4/02* (2006.01)

(52) U.S. Cl.
  CPC ...... *D10B 2321/10* (2013.01); *D10B 2401/10* (2013.01); *H01M 2004/021* (2013.01)

(56) References Cited

U.S. PATENT DOCUMENTS

2019/0245233 A1  8/2019  Pintauro et al.
2020/0181804 A1  6/2020  Kas et al.

* cited by examiner

COMPOSITE FIBER ELECTRODES AND APPLICATIONS OF SAME

CROSS-REFERENCE TO RELATED PATENT APPLICATION

This application claims priority to and the benefit of U.S. Provisional Patent Application Ser. No. 63/035,918, filed Jun. 8, 2020, which is incorporated herein by reference in its entirety.

STATEMENT AS TO RIGHTS UNDER FEDERALLY-SPONSORED RESEARCH

This invention was made with government support under Contracts No. DE-EE0007215 and DE-EE0007635 awarded by the Department of Energy. The government has certain rights in the invention.

FIELD OF THE INVENTION

The invention relates generally to the field of materials, and more particularly to composite electrodes and electrochemical devices having the same.

BACKGROUND OF THE INVENTION

Fiber mat electrodes that can be used in electrochemical devices are usually fabricated by electrospinning dispersions of polymers and catalyst particles in solvents. It is known that the performance of an electrochemical device such as a battery is dependent on the fabricating processes and materials of electrodes of the battery, and in particular, ingredients and characteristics of the electrodes. Therefore, there is a need to develop novel composite fiber electrodes of special relevance for improvement of the performance of electrochemical devices.

SUMMARY OF THE INVENTION

One of the objectives of this invention is to develop composite electrodes, for example, but are not limited to, dual (multiple) fiber mat electrodes, where the electrochemically active species is in one fiber and electrically conductive particles are in another fiber or fiber/particle electrodes where polymer or particle/polymer droplets are added to a mat of one or multiple fibers where the droplets are added by spraying. The fiber mat electrodes can be used in batteries, fuel cells, and electrochemical reactors, sensors or electrolyzers, and so on.

In one aspect of the invention, the composite electrode comprises two or more types of fibers forming a fiber network, comprising at least a first type of fibers and a second type of fibers, where the first type of fibers comprises a first polymer and a first type of particles; and the second type of fibers comprises a second polymer and a second type of particles; and the second polymer is same as or different from the first polymer, and the second type of particles are same as or different from the first type of particles.

In one embodiment, each of the first polymer and the second polymer comprises polyacrylic acid (PAA), polyamide-imide (PAI), polyvinylidene fluoride (PVDF), polyethylene oxide (PEO), or polyacrylonitrile (PAN).

In one embodiment, each of the first type of particles and the second type of particles comprises electrochemically active particles, or electrically conductive particles.

In one embodiment, the electrochemically active particles comprise silicon (Si) particles, Si nanoparticles, Si nanowires, Si-carbon particles, titania particles, and/or precious metal (such as Pt, Pd, Ru, Ir), metal alloy (such as PtNi or PtCo) or non-precious metal catalysts (such as those with Fe—N—C active sites) on a conductive support (like carbon) or on a non-conductive support like titania or alumina, and wherein the electrically conductive particles comprise carbon particles, graphite particles, carbon black particles, carbon nanotubes, carbon fibers, or a mixture thereof.

In one embodiment, the first type of fibers is formed by electrospinning a first solution containing the first polymer and the first type of particles; and the second type of fibers is formed by electrospinning a second solution containing another the second polymer and the second type of particles.

In one embodiment, the first type of fibers comprises electrospun Si/PAA fibers, and the second type of fibers comprises electrospun C/PAN fibers.

In one embodiment, a ratio of the electrospun Si/PAA fibers to the electrospun C/PAN fibers is 70:30 wt. %.

In one embodiment, a Si:PPA ratio of the electrospun Si/PAA fibers is 50:50 wt. %, and a C:PAN ratio of the electrospun C/PAN fibers is 63:37 wt. %.

In another aspect of the invention, the composite electrode comprises at least one type of fibers forming a fiber network; and at least one type of droplets interspersed in the fiber network, where said at least one type of fibers comprises a first polymer and a first type of particles; and wherein said at least one type of droplets comprises a second types of particles.

In one embodiment, each of the first type of particles and the second type of particles comprises electrochemically active particles, or electrically conductive particles.

In one embodiment, the electrochemically active particles comprise silicon (Si) particles, Si nanoparticles, Si nanowires, Si-carbon particles, titania particles, and/or precious metal or non-precious metal catalysts particles on non-conductive supports like titania or alumina, and the electrically conductive particles comprise carbon particles, graphite particles, carbon black particles, carbon nanotubes, carbon fibers, or a mixture thereof.

In one embodiment, said at least one type of droplets further comprises a second polymer.

In one embodiment, each of the first polymer and the second polymer comprises PAA, PAI, PVDF, PEO, or PAN.

In one embodiment, said at least one type of fibers is formed by electrospinning a first solution containing the first polymer and the first type of particles, and wherein said at least one type of droplets is formed by spraying/electrospraying a second solution the second polymer and the second type of particles.

In one embodiment, said at least one type of fibers comprises electrospun Si/PAA fibers, and said at least one type of droplets comprises sprayed/electrosprayed C/PVDF droplets, or sprayed/electrosprayed C/PAI droplets.

In one embodiment, a Si:PAA ratio of the electrospun Si/PAA fibers is 60:40 wt. %, and a C:PVDF ratio of the C/PVDF sprayed/electrosprayed droplets is 83:17 wt. %.

In one embodiment, the composite electrode has 20 wt. % carbon, 45 wt. % silicon, 35 wt. % binder.

In yet another aspect of the invention, the composite electrode is a single fiber mat or a mat composed or a mat with multiple different fibers formed by a coating or spraying process, where the ink that used during the coating or spraying comprises fibers, a solvent, and optionally solid particles or polymer droplets. The ink is deposited onto a membrane/separator or on a conductive substrate to form the fiber/particle, multi-fiber, or multi-layer/particle electrode after solvent removal, wherein the fibers are pre-formed before preparation of the electrode ink via a fiber spinning process; and the fibers comprises one or more polymers, and/or one or more types of particles. As used here and elsewhere in the disclosure, the term "particle" refers to a solid particle, a polymer droplet dispersed in the ink, or a droplet containing a polymer and one or more solid particles.

In one embodiment, the electrode ink further comprises the pre-formed fibers and a polymeric binder dispersed in the solvent.

In one embodiment, the electrode ink comprises the pre-formed fibers and micellar droplets (particles) of a water-insoluble polymer dispersed in the solvent, wherein the solvent is a water or water/alcohol solvent.

In one embodiment, the water-insoluble polymer comprises a perfluorosulfonic acid polymer or a water insoluble hydrocarbon polymer with negatively charged or positively charged ion-exchange groups.

In one embodiment, said one or more types of particles comprise catalyst particles or particles of an electrochemically active material, optionally mixed with a polymeric binder.

In one embodiment, said one or more types of particles comprise micellar polymer droplets.

In one embodiment, the fiber spinning process comprises electrospinning, centrifugal spinning, gas jet fiber spinning, or some other spinning method to make fibers of submicron diameter.

In one embodiment, said coating the electrode ink is performed by spraying coating, electrospraying, ultrasonic spraying, slot-die coating, or spin-coating.

In one embodiment, the pre-formed fibers in the electrode ink comprise only one type of fibers.

In one embodiment, the pre-formed fibers in the electrode ink comprise two or more different types of fibers, wherein each type of the fibers differs in the type/amount of particles, and/or the type/amount of a polymer binder, and/or the fiber morphology including fiber diameter and internal fiber porosity.

In one embodiment, the composite electrode is a layered electrode structure having multiple layers of composite fiber electrodes deposited onto one another.

In one embodiment, the composite electrode is a layered or gradient-composition electrode structure formed by coating multiple different fiber-containing inks onto one another sequentially.

In one embodiment, each of said multiple different fiber-containing inks differs in fiber type/structure including fiber diameter and porosity, fiber composition, binder type and amount and/or solvent type and amount.

In one embodiment, thickness and porosity of each layer are fixed or variable.

In certain aspects, the invention also relates to an electrochemical device comprising any one of fiber electrodes as recited above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

FIG. 6A: As spun raw mat. FIG. 6B: Cross section of welded and compacted mat.

DETAILED DESCRIPTION OF THE INVENTION

Figures 1A, 1B:
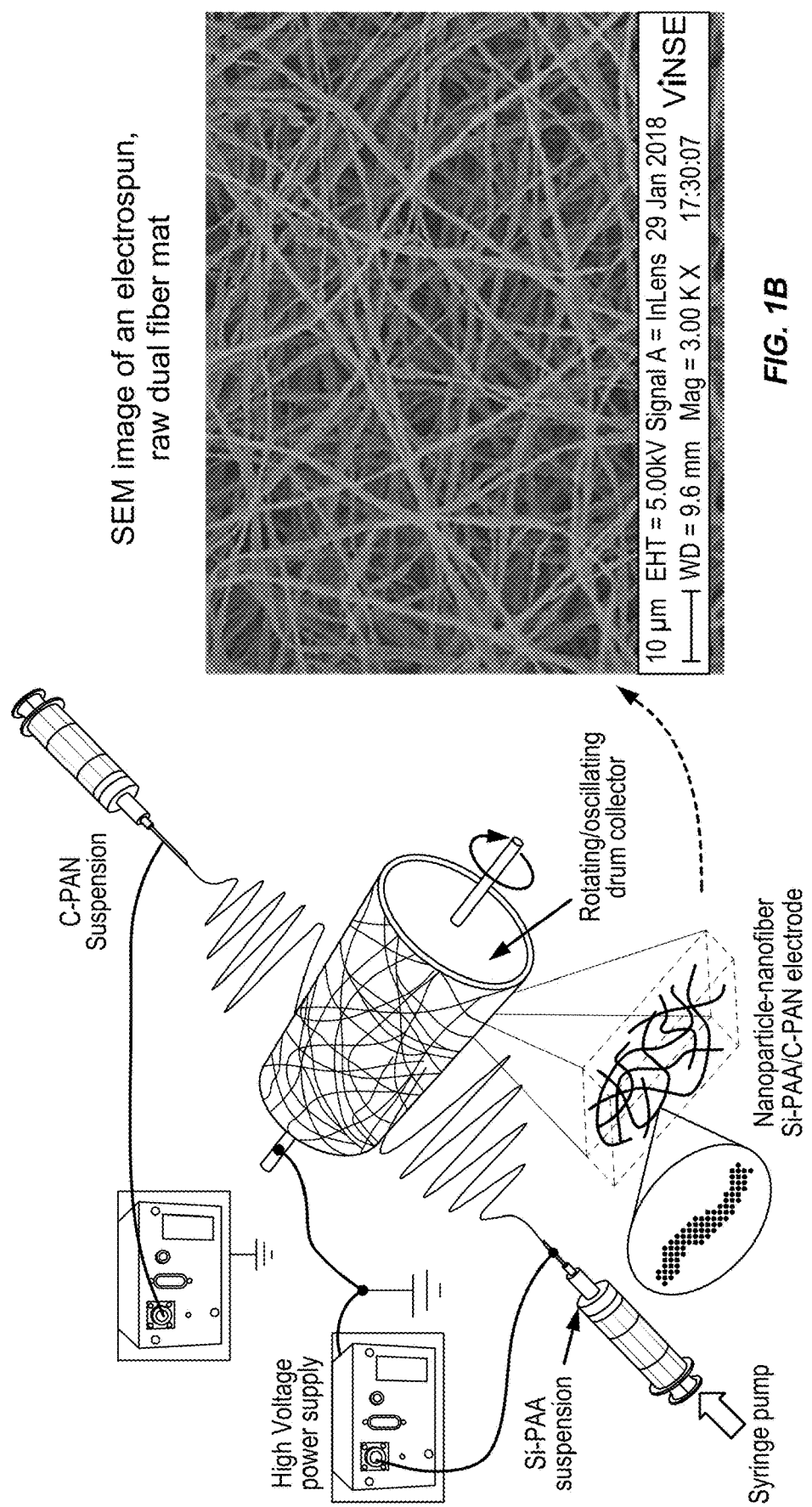
FIGS. 1A-1B show respectively a schematic of a dual fiber Si-PAA/C-PAN anode mat fabrication and an SEM image of an exemplary dual fiber mat, according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Aspects of the invention relate to composite electrodes and electrochemical devices having the same. The composite electrodes are multi-fiber electrodes having two or more different fibers in the electrodes, or one or more fibers and one or more different sprayed/electrosprayed droplets/particles in the electrodes, where the composition of each particle/polymer fiber is different, and/or the composition of the one or more fibers and the one or more sprayed droplets is different. Sprayed material can be: (1) particles only, (2) polymer particles that may be suspended in a solvent as micelles/droplets, or (3) droplets containing polymer and particles, with or without solvent. Exemplary applications of the composite electrodes are as electrodes (anode and/or cathode) in, but are not limited to, batteries (primary, secondary, and redox flow batteries), proton exchange membrane and alkaline fuel cells, electrolyzers, electrochemical reactors including those for inorganic and organic synthesis and those used for $CO_2$ reduction, sensors, capacitors, and other electrochemical devices. Such electrodes are composed of (1) a mixture of two or more distinctly different particle/polymer fibers (hereinafter identified as a dual fiber mat for the case where there are two distinct fibers), and/or (2) a fiber mat with sprayed/electrosprayed particles on and between the fibers (hereinafter called an electrospun/electrosprayed mat), and/or (3) an electrode made by a coating method wherein the ink contains one or more pre-formed fibers and one or more suspended/dispersed droplets or solid particles where said droplets are a dispersion of polymer droplets/micelles or the droplets contain both solid particles and polymer. In a dual fiber mat, the two types of fibers may differ by: (a) using different polymer binders with the same particles, (b) using different particles and the same polymer binder, or (c) using different particles and polymer binders for the two fibers. The method and materials can be extended to fiber mats electrodes containing three or more different fibers, fiber mats containing one type of particle/polymer fiber and two or more different types of sprayed droplets, and fiber mats containing two or more different fibers and two or more different sprayed droplets.

Another aspects of the invention also include (i) a composite electrode where one of the electrospun fibers and/or one of the types of droplets contains no particles and (ii) a composite electrode composed of multiple particle/polymer droplets and no fibers.

In addition, it should be appreciated that the general spun/sprayed fiber mat configuration can also be used in non-electrochemical applications.

The following exemplary embodiments further illustrate the invention but should not be construed as in any way limiting the scope of the invention.

In one aspect of the invention, the composite electrode comprises two or more types of fibers forming a fiber network, comprising at least a first type of fibers and a second type of fibers, where the first type of fibers comprises a first polymer and a first type of particles; and the second type of fibers comprises a second polymer and a second type of particles; and the second polymer is same as or different from the first polymer, and the second type of particles are same as or different from the first type of particles.

In certain embodiments, each of the first polymer and the second polymer comprises polyacrylic acid (PAA), polyamide-imide (PAI), polyvinylidene fluoride (PVDF), polyethylene oxide (PEO), or polyacrylonitrile (PAN).

In certain embodiments, each of the first type of particles and the second type of particles comprises electrochemically active particles, or electrically conductive particles.

In certain embodiments, the electrochemically active particles comprise silicon (Si) particles, Si nanoparticles, Si nanowires, Si-carbon particles, titania particles, and/or precious metal (such as Pt, Ir, Ru Pd, Ni, Ag), metal alloys (such as PtNi or PtCo), or non-precious metal catalysts (such those with Fe—N—C active sites) on a conductive support like carbon or on a non-conductive support like titania or alumina.

The electrically conductive particles comprise carbon particles, graphite particles, carbon black particles, carbon nanotubes, carbon fibers, or a mixture thereof.

In certain embodiments, the first type of fibers is formed by electrospinning a first solution containing the first polymer and the first type of particles; and the second type of fibers is formed by electrospinning a second solution containing another the second polymer and the second type of particles.

In one exemplary embodiment disclosed in EXAMPLE 1 below, the first type of fibers comprises electrospun Si/PAA fibers, and the second type of fibers comprises electrospun C/PAN fibers. The ratio of the electrospun Si/PAA fibers to the electrospun C/PAN fibers is about 70:30 wt. %. The Si:PPA ratio of the electrospun Si/PAA fibers is about 50:50 wt. %, and a C:PAN ratio of the electrospun C/PAN fibers is about 63:37 wt. %.

In one exemplary embodiment shown in FIG. 1A, the first type of fibers and the second type of fibers are simultaneously electrospun/coated (i.e., co-electrospun) on a drum collector or a substrate. In another embodiment, the first type of fibers and the second type of fibers are sequentially electrospun/coated onto one another on a drum collector or a substrate, so that the composite electrode comprises a layered structure with each layer thickness and porosity fixed or variable.

In another aspect of the invention, the composite electrode comprises at least one type of fibers forming a fiber network; and at least one type of droplets interspersed in the fiber network, where said at least one type of fibers comprises a first polymer and a first type of particles; and wherein said at least one type of droplets comprises a second types of particles.

In certain embodiments, each of the first type of particles and the second type of particles comprises electrochemically active particles, or electrically conductive particles.

In certain embodiments, the electrochemically active particles comprise silicon (Si) particles, Si nanoparticles, Si nanowires, Si-carbon particles, titania particles, and/or precious metal or non-precious metal catalysts particles on non-conductive supports like titania or alumina, and the electrically conductive particles comprise carbon particles, graphite particles, carbon black particles, carbon nanotubes, carbon fibers, or a mixture thereof.

In certain embodiments, said at least one type of droplets further comprises a second polymer.

In certain embodiments, each of the first polymer and the second polymer comprises PAA, PAT, PVDF, or PAN.

In certain embodiments, said at least one type of fibers is formed by electrospinning a first solution containing the first polymer and the first type of particles, and wherein said at least one type of droplets is formed by spraying/electrospraying a second solution the second polymer and the second type of particles.

In one exemplary embodiment disclosed in EXAMPLE 2 below, said at least one type of fibers comprises electrospun Si/PAA fibers, and said at least one type of droplets comprises sprayed/electrosprayed C/PVDF droplets, or sprayed/electrosprayed C/PAI droplets. The Si:PAA ratio of the electrospun Si/PAA fibers is about 60:40 wt. %, and a C:PVDF ratio of the C/PVDF sprayed/electrosprayed droplets is about 83:17 wt. %. The composite electrode has about 20 wt. % carbon, about 45 wt. % silicon, about 35 wt. % binder.

Figure 4:
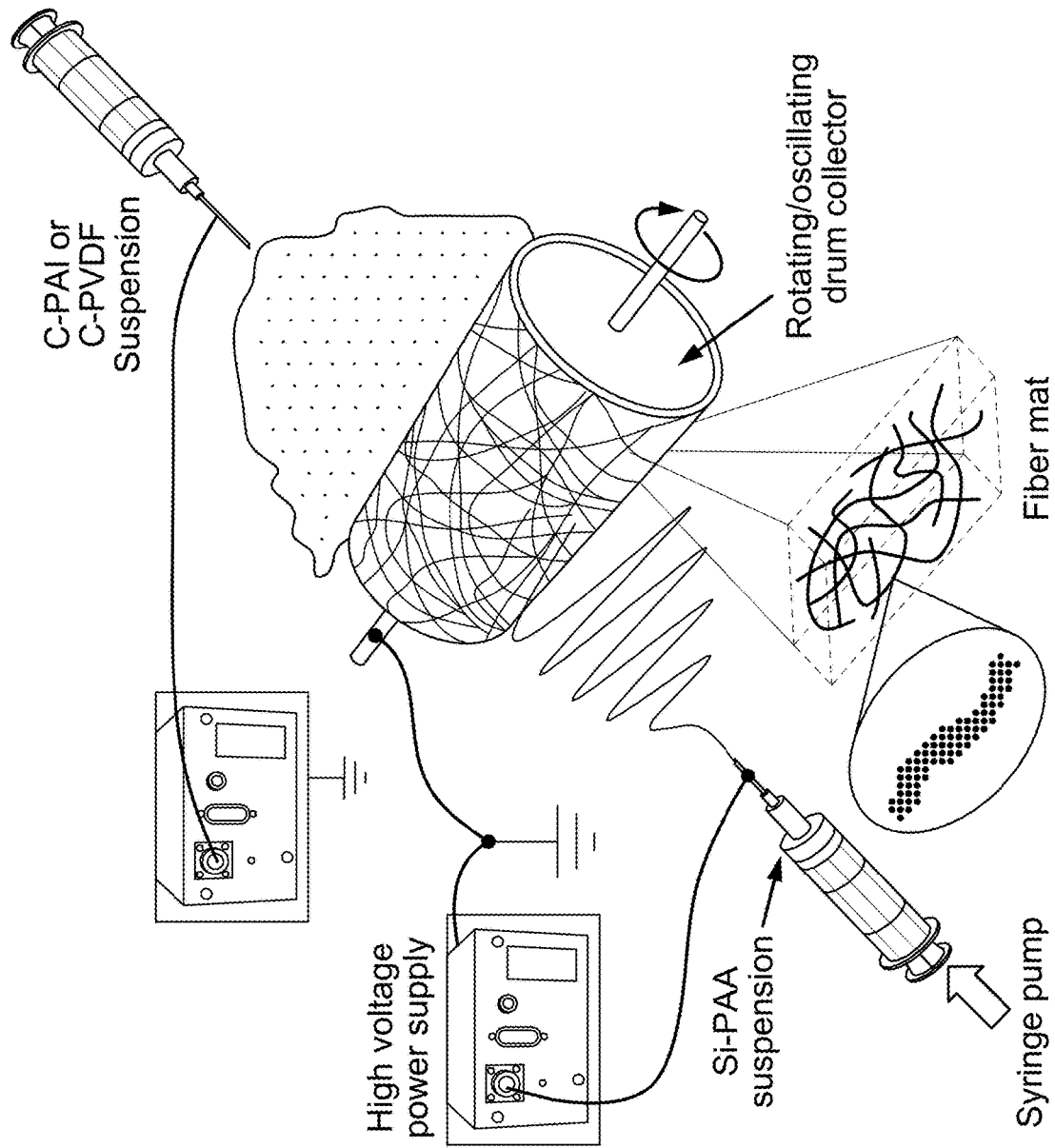
FIG. 4 shows a schematic of an electrospun/electrosprayed fiber mat fabrication, according to embodiments of the invention.

In one exemplary embodiment shown in FIG. 4, the one type of fibers and the one type of droplets are simultaneously electrospun and electrosprayed on a drum collector or a substrate. In another embodiment, the one type of fibers and the one type of droplets are sequentially electrospun and electrosprayed onto one another on a drum collector or a substrate, so that the composite electrode comprises a layered structure with layer thickness and porosity fixed or variable.

In yet another aspect of the invention, the composite electrode is a multi-fiber electrode formed by coating an electrode ink comprising fibers and a solvent on a membrane/separator or on a conductive substrate to form the multi-fiber electrode after solvent removal, wherein the fibers are pre-formed before preparation of the electrode ink via a fiber spinning process; and the fibers comprises one or more polymers, and/or one or more types of particles.

In certain embodiments, the electrode ink further comprises the pre-formed fibers and a polymeric binder dispersed in the solvent.

In certain embodiments, the electrode ink comprises the pre-formed fibers and micellar droplets (particles) of a water-insoluble polymer dispersed in the solvent, wherein the solvent is a water/alcohol solvent.

In certain embodiments, the water-insoluble polymer comprises a perfluorosulfonic acid (PFSA) polymer or a hydrocarbon polymer with negative fixed charged sites.

In certain embodiments, said one or more types of particles comprise catalyst particles or particles of an electrochemically active material, optionally mixed with a polymeric binder.

In certain embodiments, said one or more types of particles comprise micellar polymer droplets.

In certain embodiments, the fiber spinning process comprises electrospinning with needle orifices, needless electrospinning, centrifugal spinning, or gas jet fiber spinning.

In certain embodiments, said coating the electrode ink is performed by spraying coating, electrospraying, ultrasonic spraying, or slot-die coating.

In certain embodiments, the pre-formed fibers in the electrode ink comprise only one type of fibers.

In certain embodiments, the pre-formed fibers in the electrode ink comprise two or more different types of fibers, wherein each type of the fibers differs in the type/amount of particles, and/or the type/amount of a polymer binder, and/or the fiber morphology including fiber diameter and internal fiber porosity.

In certain embodiments, the ink for coating contains one or more pre-formed fibers and one or more different types of dispersed droplets, where the droplets are composed of particles, polymer, or a mixture of particles and polymer.

In certain embodiments, the composite electrode is a layered electrode structure having multiple layers of composite fiber electrodes deposited onto one another.

In certain embodiments, the composite electrode is a layered or gradient-composition electrode structure formed by coating multiple different fiber-containing inks onto one another sequentially.

In certain embodiments, each of said multiple different fiber-containing inks differs in fiber type/structure including fiber diameter and porosity, fiber composition, and binder type and amount.

In certain embodiments, thickness and porosity of each layer are fixed or variable.

Certain aspects of the invention also disclose the composite electrode comprising two or more types of fibers, and one or multiple different types of particle/polymer fibers and one or more different sprayed droplets. Each type of the fibers comprises a different type/amount of particles and/or a different type/amount of polymer binder. The multiple fibers and multiple sprayed droplets differ in the type/amount of particles and the type/amount of polymer.

In certain embodiments, the fibers and/or droplets are submicron in diameter.

In certain embodiments, the composite electrode includes Si particles, Si nanoparticles, Si nanowires, Si-carbon particles, titania particles, and/or precious metal or non-precious metal catalysts particles on non-conductive supports like titania or alumina as an electrochemically active material and a carbon material as an electrically conductive material.

In certain embodiments, the Si particles, Si nanoparticles, Si nanowires, Si-carbon particles, titania particles, and/or precious metal or non-precious metal catalysts particles on a conductive support like carbon or on a non-conductive support like titania or alumina are contained in a nanofiber network.

In certain embodiments, the electrically conductive material is carbon particles, graphite particles, carbon black particles, carbon nanotubes, or mixtures thereof.

In certain embodiments, the carbon particles, graphite particles, carbon black particles, carbon nanotubes, carbon fibers, or mixtures thereof are contained in a nanofiber network.

In certain embodiments, the carbon particles, graphite particles, carbon black particles, carbon nanotubes, carbon fibers, or mixtures thereof are contained in droplets which coat the Si fibers and/or distribute/located between the Si fibers.

In certain embodiments, the composite electrode includes electrospun Si/PAA fibers and electrosprayed C/PAI droplets.

In certain embodiments, the composite electrode includes electrospun Si/PAA fibers and electrosprayed C/PVDF droplets.

In certain embodiments, the composite electrode includes electrospun Si/PAA fibers and electrospun C/PAI fibers.

In certain embodiments, the sprayed droplets of electrically conductive material have no binder.

In certain embodiments, a multi-fiber electrode is prepared using an electrode ink containing fibers and solvent (with/without a binder) where the fibers are pre-formed before ink preparation via needle or needleless electrospinning and where the fibers are composed of only polymer (one or more polymers), or one or more types of catalyst particles or particles of an electrochemically active material with a polymeric binder, where the binder may be composed of one or more polymers. In this embodiment, the procedure for fabricating such a multi-fiber electrode is as follows: (1) separately create fiber mats by spinning polymer fibers or particle/polymer fibers via electrospinning or some other fiber spinning process such as centrifugal spinning, (2) combine/mix the fibers in a solvent at a given solvent (e.g., water or a mixture of water and alcohol), with or without a polymer binder (i.e., optionally add a polymeric binder to the catalyst/solvent suspension), and (3) use a coating method (e.g., spraying coating, electrospraying, ultrasonic spraying, or slot-die coating) to coat the ink on a membrane/separator or on a conductive substrate to create (after solvent removal) a multi-fiber electrode. In some cases there may only be one type of fiber in the ink, in other applications of this technology the ink may contain two or more different types of fibers, where the fibers differ in the type/amount of particles and/or the type/amount of polymer binder and/or the fiber morphology (e.g., fiber diameter, internal fiber porosity, etc.).

In certain embodiments, multiple layers of composite fiber electrodes are deposited onto one another to create a layered electrode structure. In another embodiment of this invention, multiple different fiber-containing inks are coated onto one another sequentially to give a layered or gradient-composition electrode structure. For these layered constructs, the fiber type/structure (fiber diameter and porosity), fiber composition, and binder type and amount will vary in each layer because different fiber-containing inks are used for each layer. Additionally, the thickness and porosity of each layer can be varied.

In certain embodiments, the ink for coating contains dispersion of a perfluorosulfonic acid polymer and pre-formed fibers, where said fibers contain a precious metal catalyst powder (such at Pt/C) or a precious metal alloy catalyst powder (such as PtNi/C or PtCo/C) and a polymer binder.

As a particular example, the composite electrode is composed of fibers containing electrochemically active particles in a polymer binder, where the particles have minimal electrical conductivity. Electron flow (electrical conductivity) throughout the fiber mat is created by: (1) co-electrospinning (via dual fiber electrospinning) conductive particles in a polymer binder, or (2) electrospraying electrically conductive particles while electrospinning fibers of electrochemically active particles. For a lithium-ion battery anode, one can electrospin Si nanoparticles or nanowires with a suitable binder such as poly(acrylic acid) while simultaneously electrospinning carbon black powder fibers with a polymer binder (e.g., PVDF or PAN). Alternatively, one can electrospin a fiber mat where the fibers are composed of Si nanoparticles or nanowires in a polymer binder and carbon powder is introduced into the electrode via simultaneously electrospraying a mixture of carbon black with a solvent and polymer binder.

In certain embodiments, the composite electrodes can be made using an electric field (electrospinning and electrospraying). Fiber mats can also be made by spinning and spraying methods that do not involve an electric filed, such as centrifugal fiber spinning and gas jet fiber spinning and air-brush spraying The fiber mats can be produced via electrospinning and electrospraying using single or multiple needle equipment, by needless electrospinning, or by a combination of needle and needleless electrospinning. Additionally, the electrospraying step for electrospun/electrosprayed fiber mats can be prepared by any kind of spraying methods that result in deposited droplets smaller than about 1-2 microns.

In certain embodiments, the composite electrode is a silicon anode for lithium ion batteries, where the Si and electrically conductive material (carbon or graphite) or separated in the electrode, with the Si nanoparticles or nanowires are in the fibers and the carbon is either in a separate fiber co-electrospun with the Si fibers or in a sprayed (electrosprayed) coating on the fibers, with some sprayed droplets between the fibers. In one exemplary example, the Si anode underwent 1,000 charge/discharge cycles and was still working well. That would be at least 3 years of charge/discharge operation for an electric vehicle battery.

It should be appreciated that such composite electrodes can be used as the anode and/or cathode in other battery systems.

In certain embodiments, an electrode for an electrochemical device (fuel cell, battery, supercapacitor, or electrolyzer) includes the electrochemically active material and the electrically conductive material are separated, either as two distinct electrospun fibers, or as fibers and sprayed droplets, where the droplets coat the fibers, and/or are deposited between the fibers.

As another exemplar example, a fuel cell electrode is described in EXAMPLE 3 below. In this example, the term "particle" refers to a micellar polymer droplet dispersed in a solvent. The fuel cell electrode contains fibers and polymer particles. The electrode is prepared from an ink containing one fiber type, where polymer droplets (particles) are dispersed in the ink. The electrode is a composite structure, with pre-formed fibers mixed and micellar droplets (particles) of a perfluorosulfonic acid polymer or some other water-insoluble polymer dispersed in a water/alcohol solvent.

In certain aspects, the invention also relates to an electrochemical device comprising any one of fiber electrodes as recited above.

These and other aspects of the present invention are further described in the following section. Without intending to limit the scope of the invention, further exemplary implementations of the present invention according to the embodiments of the present invention are given below. Note that titles or subtitles may be used in the examples for the convenience of a reader, which in no way should limit the scope of the invention. Moreover, certain theories are proposed and disclosed herein; however, in no way should they, whether they are right or wrong, limit the scope of the invention so long as the invention is practiced according to the invention without regard for any particular theory or scheme of action.

Example 1

Dual Fiber Mat Electrode: Si/PAA+C/PAN Dual Fiber Electrospun Mat for Li Battery Anodes To increase electrode stability (resistance to anode degradation due to Si volumetric changes) while providing robust electron conducting pathways that will experience minimal damage (carbon pulverization) during charge/discharge cycling, a dual fiber anode was examined in this exemplary example, with separate Si/PAA (PAA is an abbreviation for polyacrylic acid) and C/PAN (PAN is an abbreviation for polyacrylonitrile) fibers. A schematic diagram of the dual fiber electrospinning apparatus is shown in FIG. 1A, and a top-down SEM image of the dual fiber mat is shown in FIG. 1A.

Figure 2:
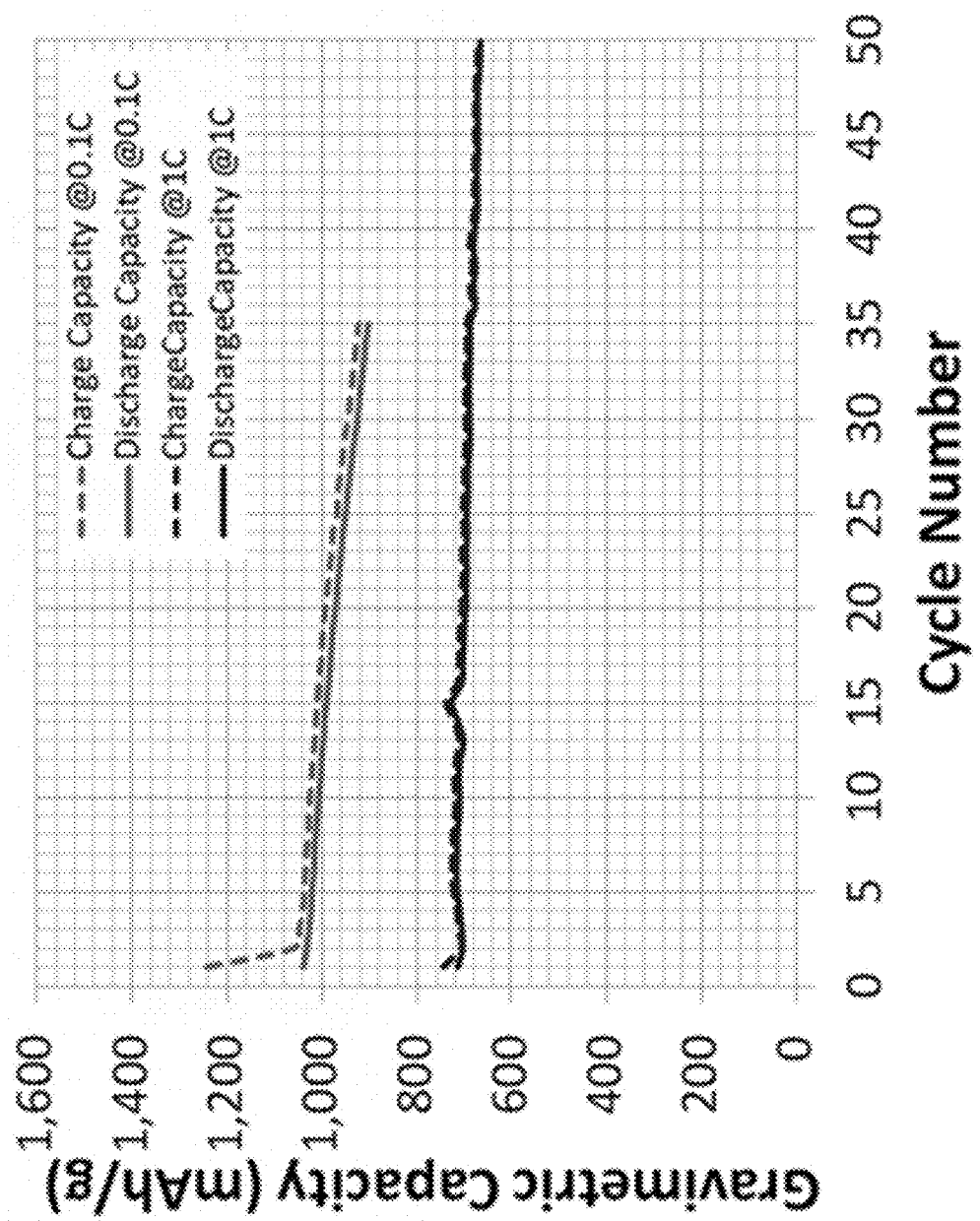
FIG. 2 shows cycling results of an anode fabricated from electrospun dual fiber mat containing about 70 wt. % of Si/PAA (about 50/50) and about 30 wt. % of C/PAN (about 63/37) fibers, according to embodiments of the invention.

Several dual fiber mats were prepared by electrospinning directly onto a copper foil current collector. A typical set of two electrospinning inks included: (i) 0.3 g Si, 0.3 g PAA, 2 g isopropanol (IPA) and 2 g methanol (MeOH), and (ii) 0.34 g C, 0.2 g PAN and 2.75 g dimethylformamide (DMF). The inks were sonicated for about 30 min and then stirred for 2 days. The dual fiber electrospinning conditions were as follows: (i) C/PAN ink—bias voltage, about 9 kV, distance to collector, about 9.4 cm, flowrate, about 0.25 ml/h, and (ii) Si/PAA ink—bias voltage, about 8 kV, distance to collector, about 7.5 cm, flowrate, about 0.85 ml/h. The difference in Si and carbon compositions of the two inks and the electrospinning flow rates determine the final Si/C content of the dual fiber anode. Electrospinning was carried out in a controlled environment chamber at a relative humidity of about 30% and a temperature of about 24° C. The mat was exposed to solvent vapor and hot pressed to decrease the electrode porosity and then dried in a vacuum oven at about 70° C. for 1 hour and then at about 110° C. overnight. The final anode mat composition for the two inks was: about 70 wt. % Si/PAA fibers (with a fiber composition of about 50/50 wt. ratio of Si/PAA) and about 30 wt. % C/PAN fibers (with an about 63/37 fiber wt. ratio of C/PAN). about A coin cell was assembled as in previous experiments with a Li metal cathode and an electrolyte of 1.2 M LiPF in a mixture of ethylene carbonate and diethyl carbonate (3/7 by volume, BASF Corp.) with about 30 wt. % fluoroethylene carbonate (BASF Corp.). A representative plot of charge/discharge cycling for the half-cell with a dual fiber anode is shown in FIG. 2. Capacity data were collected by first cycling the cell at 0.1 C for 35 cycles and then cycling the same cell at 1 C for 50 cycles. At 0.1 C, the capacity retention after 35 cycles was about 87.4% and at 1 C, it increased to about 93.4%. The theoretical capacity calculated from the anode composition (including the weights of Si, carbon and polymer binders) was about 1311 mAh/g, which was quite close to that recorded after the first cycle. The coulombic efficiency was above 98% during 0.1 C cycling and about 99.4% after 50 cycles at 1 C. Additionally, after 50 cycles at 1 C, the gravimetric capacity was about 671 mAh/g (a capacity retention of about 93.4%).

Figure 3:
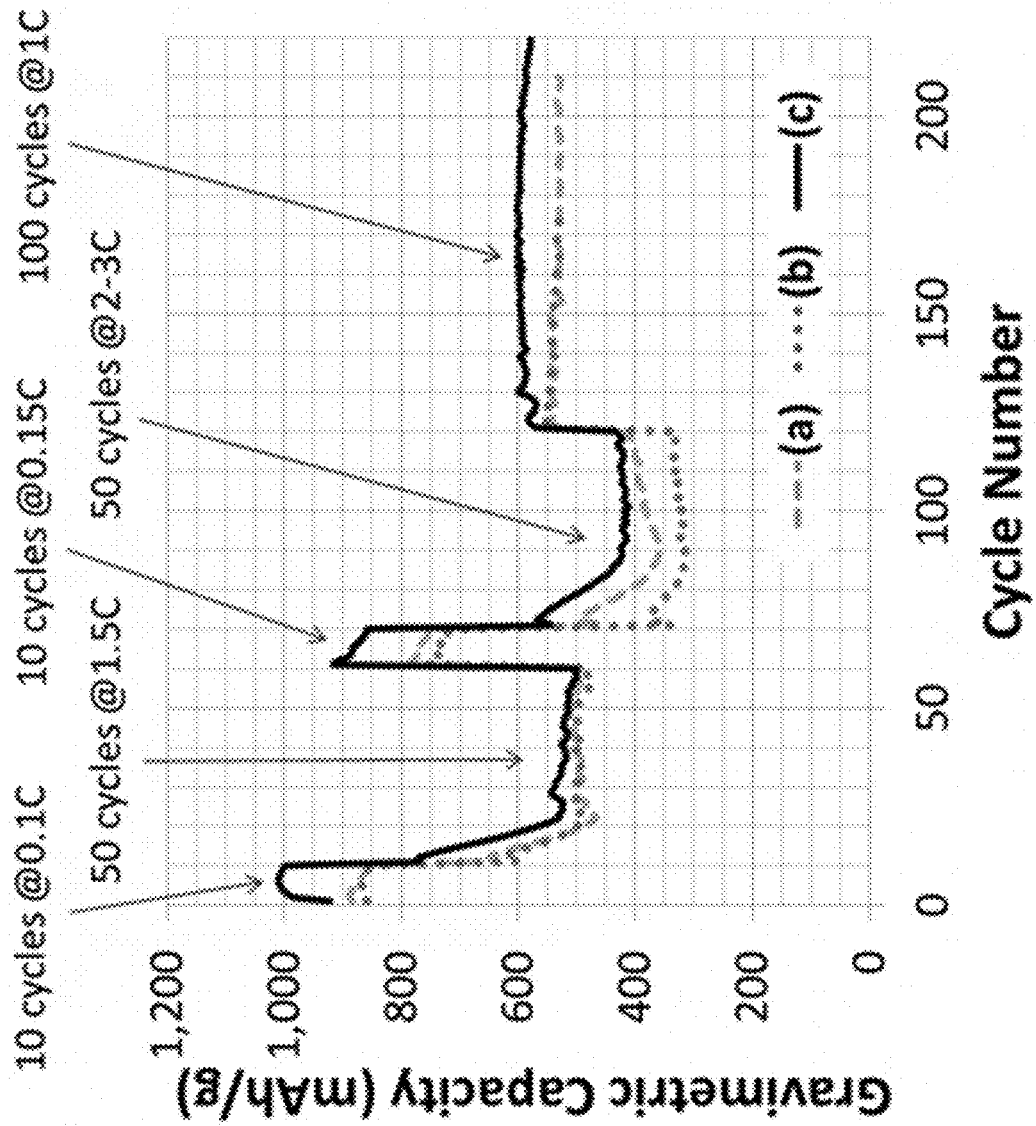
FIG. 3 shows cycling results of three dual fiber Si/PAA+C/PAN dual fiber anodes with different Si areal loading: (a) about 0.694 $mg_{Si}/cm^2$, about 50 wt. % PAA in Si/PAA fibers, (b) about 0.987 $mg_{Si}/cm^2$, about 50 wt. % PAA in Si/PAA fibers, and (c) about 1.331 $mg_{Si}/cm^2$, about 60 wt. % PAA in Si/PAA fibers, according to embodiments of the invention. The C/PAN fibers were of the same composition in all three anodes and contained about 63 wt. % C and about 37 wt. % PAN.

A long-term cycling testing was also performed with selected dual fiber anodes in half-cells. An example is shown in FIG. 3 where the cycling behavior is shown for three cells containing anodes of various Si areal loading: (a) about 0.694 $mg_{Si}/cm^2$, (b) about 0.987 $mg_{Si}/cm^2$, and (c) about 1.33 $mg_{Si}/cm^2$. The first and the second anode had about 50 wt. % PAA in the Si/PAA fibers and the third anode had about 60 wt. % PAA binder. The C/PAN fibers were of the same composition in all three anodes and contained about 63 wt. % C and about 37 wt. % PAN. The best performing cell had an anode with about 1.33 $mg_{Si}/cm^2$ with about 40/60 Si/PAA fibers. This anode had an areal capacity of about 0.8 mAh/cm$^2$ at 1 C after 170 cycles (where the C-rate was varied from 0.1 C to 2 C).

Example 2

Mats With Electrospun Si/PAA Fibers and Electrosprayed C/PAI or C/PVDF Droplets

In this exemplary example, a nanofiber-based anode design was examined where Si nanoparticles were electrospun into fibers with PAA binder and carbon was simultaneously electrosprayed as nanodroplets with a polymer binder, either PVDF or PAI. Such a process was used to make a Si+carbon anode for a Li-ion battery. This anode design separates Si and carbon to prevent carbon particle pulverization during charge/discharge cycling. During anode mat preparation, silicon and carbon were deposited from separate spinnerets but while a Si/PAA solution formed continuous fibers by electrospinning, the carbon/binder solution was deposited as nano/micro-droplets via electrospraying.

The potential benefits of an electrospun+electrosprayed anode are, but not limited to, (1) the beneficial high electrode/electrolyte interfacial area for Si/PAA nanofibers is retained, (2) a lower binder content can be used with carbon powder, because well-formed fibers are not needed, thus the electronic conductivity of the C/binder component of the anode is improved, and (3) it is not required that the carbon binder is electrospinnable so a wider range of polymers is available for electrospraying.

A schematic of an apparatus used to make the electrospun/electrosprayed fiber mat electrode is shown in FIG. 4 according to one embodiment of the invention. This figure is only intended to be a schematic example of the required equipment to make an electrospun/electrosprayed mat. Different embodiments of the required equipment may include: (1) the use multiple fiber electrospinning spinnerets and/or spinnerets for electrospraying, (2) the use of spinnerets other than needles to produce fibers and droplets, (3) the use a needleless electrospinning method, (4) the use a nanofiber spinning method that does not involve an electric field (e.g., gas jet fiber spinning or centrifugal spinning), and (5) the use of alternative methods to spray nanodroplets, other than electrospraying, where multiple needles or sources of droplets are used.

Figure 5B:
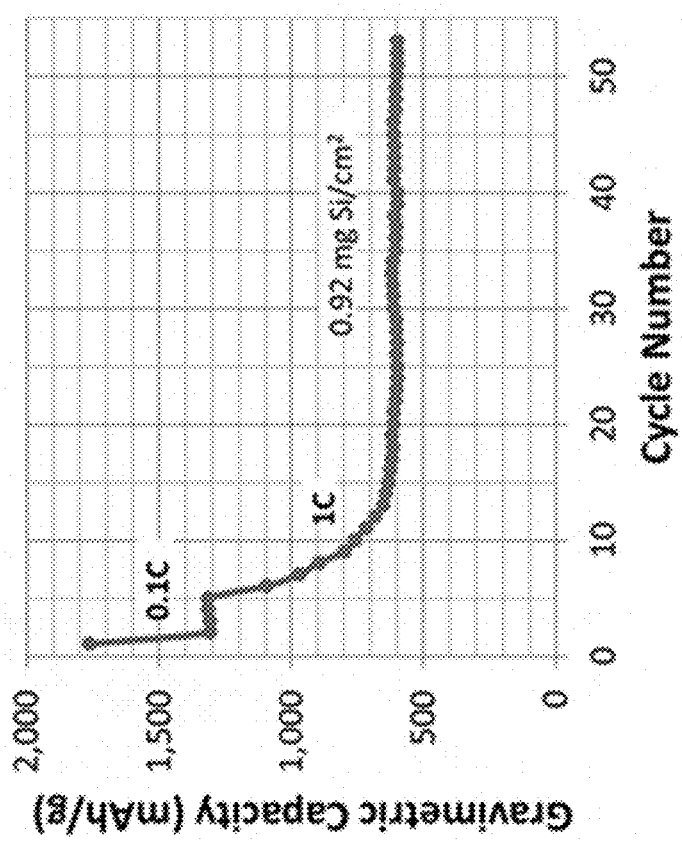
FIGS. 5A-5B show respectively (FIG. 5A) an SEM image of an as-spun Si/PAA-C/PVDF raw mat with composition: about 20 wt. % C, about 45 wt. % Si, about 35 wt. % binder (about 3 wt. % PVDF, about 32 wt. % PAA) scale bar=2 μm, and (FIG. 5B) cycling performance of the Si/PAA-C/PVDF anode, according to embodiments of the invention.
Figure 5A:
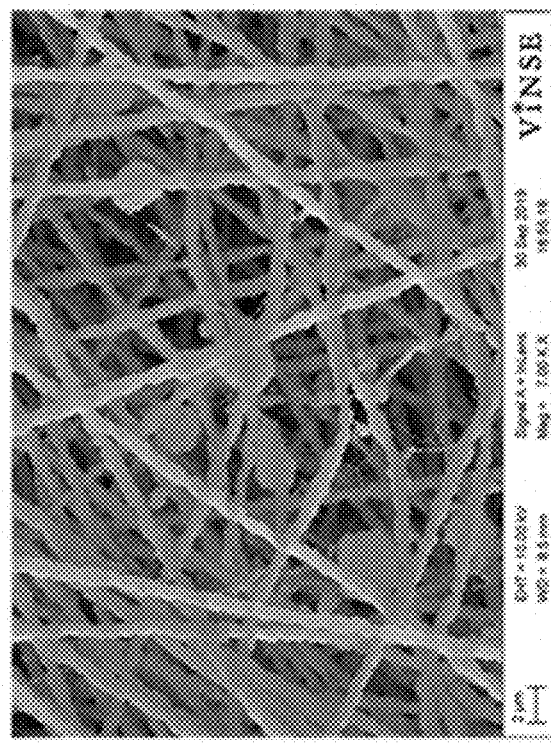

In one example, two polymer were used as the binder for electrospraying carbon: PVDF (Kynar) from Arkema and polyamide-imide (Torlon) from Solvay Specialty Polymers. The first series of experiments were performed with anodes composed of Si/PAA electrospun fibers (about 60/40 w/w Si/PAA) and C/PVDF electrosprayed droplets (about 83/17 w/w C/PVDF), with an overall anode composition of 20 wt. % carbon, 45 wt. % silicon, about 32 wt. % PAA, and about 3 wt. % PVDF. The ratio of Si fibers to C droplets was varied and the total amount of material comprising the anode differed to achieve different Si areal loadings. A representative SEM image of a spun/sprayed mat is shown in FIG. 5A (the Si areal loading was about 0.92 mg/cm$^2$). Electrosprayed nanodroplets can be seen interspersed between Si/PAA fibers and there appears to be some C/PVDF deposited onto the Si fibers. A similar morphology was seen with mats composed of Si/PAA fibers+C/PAI nanodroplets. Anode mats were further processed by interfiber welding and annealing for 2 h at 120° C. Anodes were evaluated in a CR2032 coin cells with a Li metal counter/reference electrode and an electrolyte of 1.2 M LiPF6 in 3/7 EC/EMC with about 10 wt. % FEC additive. Galvanostatic charge/discharge experiments were conducted by polarizing the cells between about 0.015 and about 1.5 V vs. Li/Li+. Cycling performance of a Si/PAA-C/PVDF anode with areal loading of 0.92 $mg_{Si}/cm^2$ is shown in FIG. 5B (0.1 C for 5 cycles and then 1 C for 50 cycles). At 1 C, the anodes exhibited an initial (10 cycles) drop in gravimetric capacity followed by about 93% capacity retention over the remaining about 40 cycles. The terminal gravimetric capacity was about 600 mAh/g and the terminal areal capacity was about 1.15 mAh/cm$^2$.

In another example, fiber mats were prepared by electrospinning a Si/PAA ink and electrospraying a carbon/polyamide-imide ink. The Si/PAA ink contained about 7.8 wt. % Si nanoparticle (about 50-100 nm) and about 5.21 wt. % PAA in a solvent mixture of n-propanol and methanol. The C/PAI ink included about 4.6 wt. % carbon black nanoparticles (about 50 nm avg.) and about 0.9 wt. % polyamide-imide (Torlon, Solvay Polymers) mixed in DMF. The overall composition of the final anode mats was about 20 wt. % carbon, about 45 wt. % Si nanoparticles, and about 35 wt. % binder (about 60/40 w/w Si/PAA fibers and about 83/17w/w C/PAI). The electrospraying conditions were as follows: Voltage=13.8 kV, Tip to collector distance=10 cm, flow rate=0.6 mL/hr, RH=30%. The electrospinning conditions were as follows: Voltage=8.2 kV, tip to collector distance=11 cm, solution flow rate=0.9 mL/hr, RH=30%.

Figure 6B:
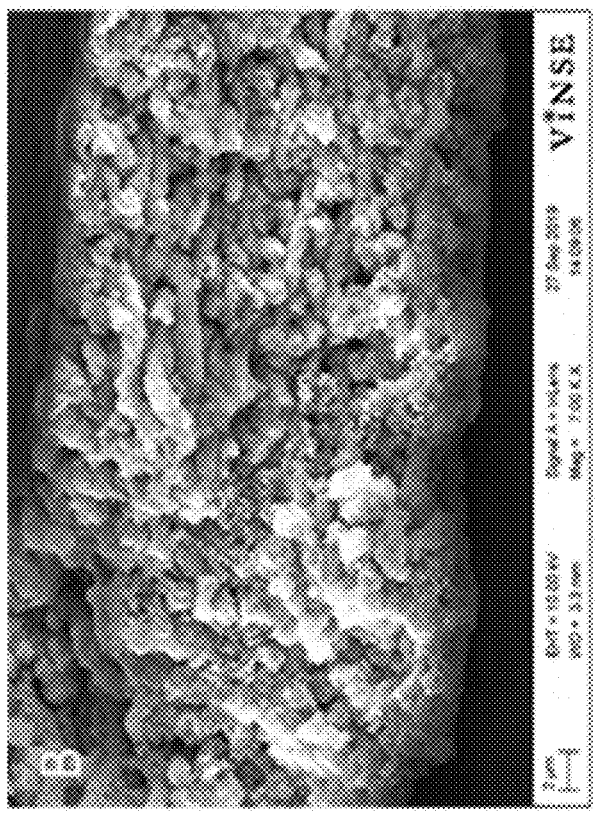
FIGS. 6A-6B show SEM images of electrospun Si-PAA/electrosprayed C-PAI mats, according to embodiments of the invention.
Figure 6A:
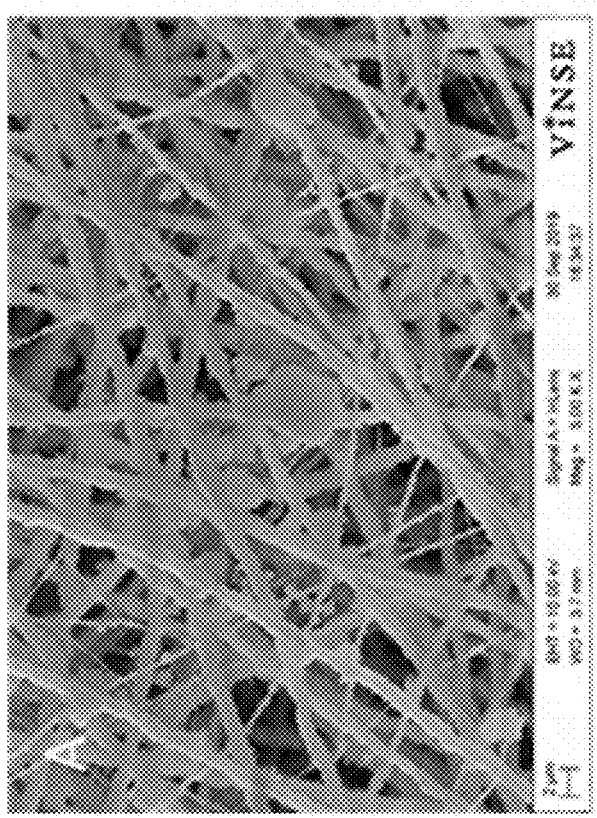

Prepared mats were compacted and welded. SEM images show a wide range of particle sizes, from as small as 100 nm to larger 4 μm particles (see, for example, FIG. 6A). The C/PAI ink is able to achieve smaller particle diameters, allowing for a more even coating of carbon on Si/PAA fibers throughout the mat, thus allowing for increased electrical conductivity. After densification and welding, the fiber structure retained through an anode mat, as indicated by the SEM fiber mat cross section shown in FIG. 6B.

CR2032 half-cells were constructed in an argon-filled glovebox using a welded/compacted fiber/sprayed mat anode on a Cu-foil current collector (10 mm in diameter) and a Li metal counter/reference electrode. The electrolyte was 1.2 M LiPF6 in a mixture of ethylene carbonate and ethyl methyl carbonate (EC/EMC 3/7 by volume, BASF Corp.). 10 wt. % fluoroethylene carbonate (BASF Corp.) was added to the electrolyte to stabilize the solid electrolyte interphase (SEI) layer. Single sheets of Celgard 2500 soaked in electrolyte were used as the separator to prevent short-circuiting of the cells during crimping, and several additional drops of electrolyte were added to completely fill the cell volume. Cells were crimped at 1000 psi and rested overnight before electrochemical characterization. All coin cells in this study were fabricated using the same method. Galvanostatic charge/discharge experiments were conducted by polarizing the cells between about 0.015-1.5 V vs. Li/Li+ at 0.1 C (about 0.2 mA/cm$^2$) for 5 cycles and then at 1 C (about 1.27 mA/cm$^2$) for 100 cycles, using an 8-channel battery tester (5 V/10 mA, MTI Corp.). C-rates for the half-cells were calculated assuming a theoretical capacity of about 3600 mAh/g for Si and about 310 mAh/g for carbon. Half-cell capacities were normalized with respect to the entire weight of an anode (i.e., total amounts of Si, C, PAA and PAI).

Figure 7:
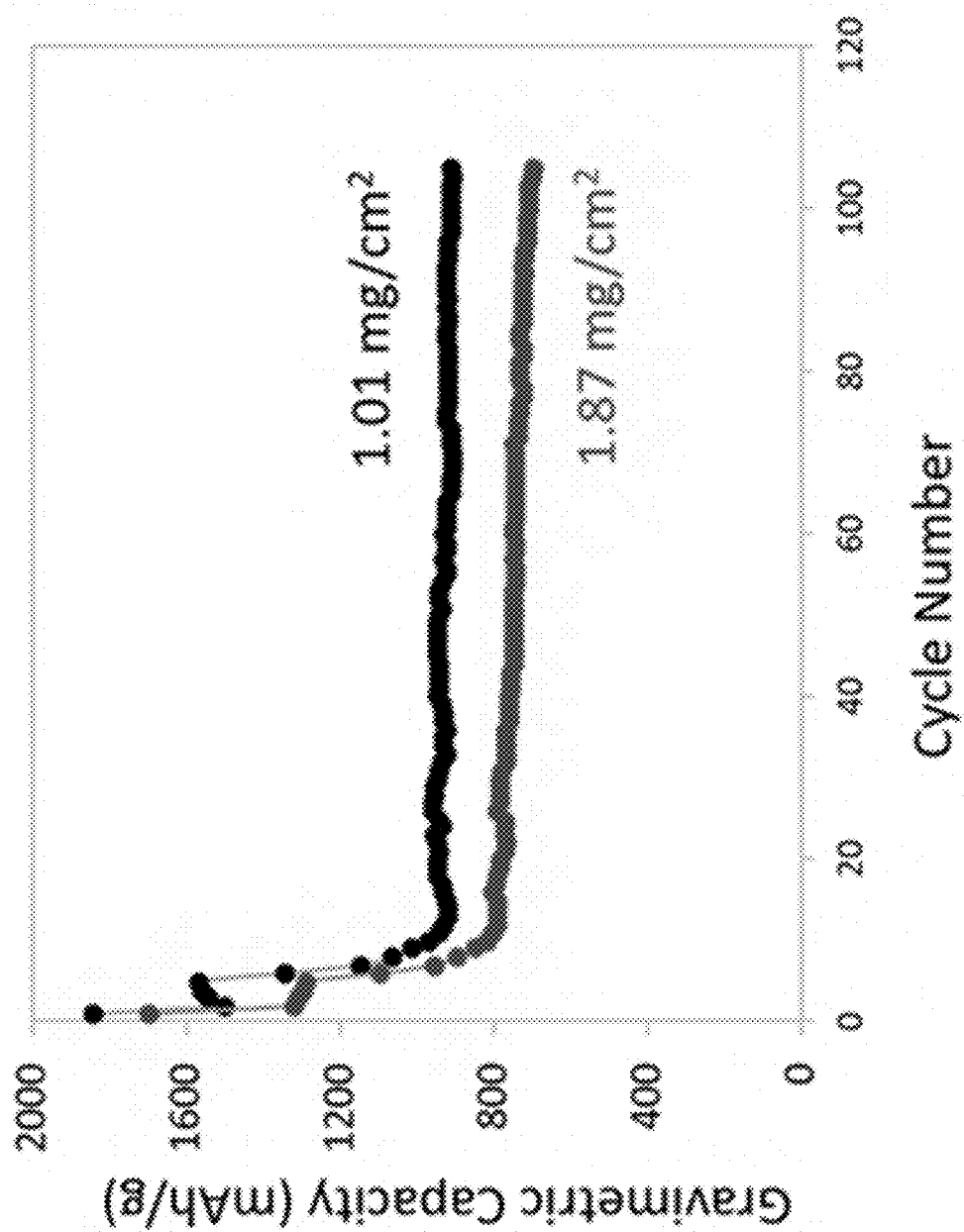
FIG. 7 shows gravimetric capacity (mAh/g) vs cycle number for Si/PAA electrospin/C-PAI electrospray anodes at two loadings (about 1.01 $mg/cm^2$ and about 1.87 $mg/cm^2$), according to embodiments of the invention.

Gravimetric capacity versus cycle number for two selected Si/PAA+C/PAI anodes is shown in FIG. 7. The anodes exhibited a high first cycle capacity, effectively utilizing all of the silicon in the mat. Lower loadings (about 1.01 mg/cm$^2$ total with about 0.46 mg/cm$^2$ silicon) achieved higher gravimetric capacities, with a terminal capacity of about 900 mAh/g at cycle 100 and an areal capacity of about 0.92 mAh/g. At the higher loading, there was some capacity fade, to about 700 mAh/g at the 100th cycle, but this anode had a higher areal capacity of about 1.29 mAh/cm$^2$ with about 0.89 mg$_{Si}$/cm$^2$. Most importantly, these anodes performed well over extended cycle numbers, offering about 90-99% capacity retention during 1 C cycling for 100 charge/discharge cycles with a coulombic efficiency >99%.

In these exemplary examples, Si+carbon dual fiber electrospun mats (EXAMPLE 1) and electrospun/electrosprayed fiber mats (EXAMPLE 2) are shown. The invention, however, is not limited to Si anodes in a Li-ion battery. They can be used as electrodes (anode and/or cathode) in: (1) batteries other than Li-ion batteries, (primary, secondary, and redox flow batteries), (2) proton exchange membrane and alkaline fuel cells, (3) electrolyzers, (4) electrochemical reactors, including those for inorganic and organic synthesis and those used for $CO_2$ reduction, (5) sensors, (6) capacitors, and (7) other electrochemical devices. The general spin/spray fiber mat configuration can also be used in non-electrochemical applications. Various aspects of the invention also relate to (i) a composite electrode where one of the electrospun fibers and/or one of the types of droplets contains no particles and (ii) a composite electrode composed of multiple particle/polymer droplets and no fibers.

Example 3

Fuel Cell Electrodes Made from Inks Containing Fibers

In this exemplary example, electrospinning inks were prepared by dispersing about 46 wt. % Pt/C (TEC10F50E from TKK), sodium form Nafion® (Liquion LQ-1115 from Ion-Power), and poly(ethylene oxide) (PEO, 600 kDa from Sigma Aldrich) into a water/alcohol mixture. The solids made up about 12 wt. % of the ink and was about 52:37:11 Pt/C:Nafion® (Na$^+$):PEO by weight percent. The water/alcohol mixture was composed of water:n-propanol:methanol. The ink was mechanically mixed and then electrospun using a single needle spinneret, a 20 cm tip-to-collector distance, about 9 kV, 0.75 ml/hr ink flowrate, and about 20% relative humidity. It should be noted that a variety of hydrogen/air fuel cell electrodes can be prepared using this technique, including different catalysts such as PtCo/C and PtNi/C, different equivalent weight ionomers in the salt or acid form, and other carrier polymers, including but not limited to PAA and PVDF. Ink ratios and electrospinning conditions may vary for these different electrode materials.

After electrospinning, fiber mats were dried under vacuum to remove any residual solvent and then thermally annealed. Post annealing, fibers were placed into a vial with a 9:1 water:IPA wt. ratio mixture. The solids content was about 4 wt. %. The fiber ink was subjected to about 1-5 minutes of sonication in a sonic bath and then mechanically mixed.

Figure 8B:
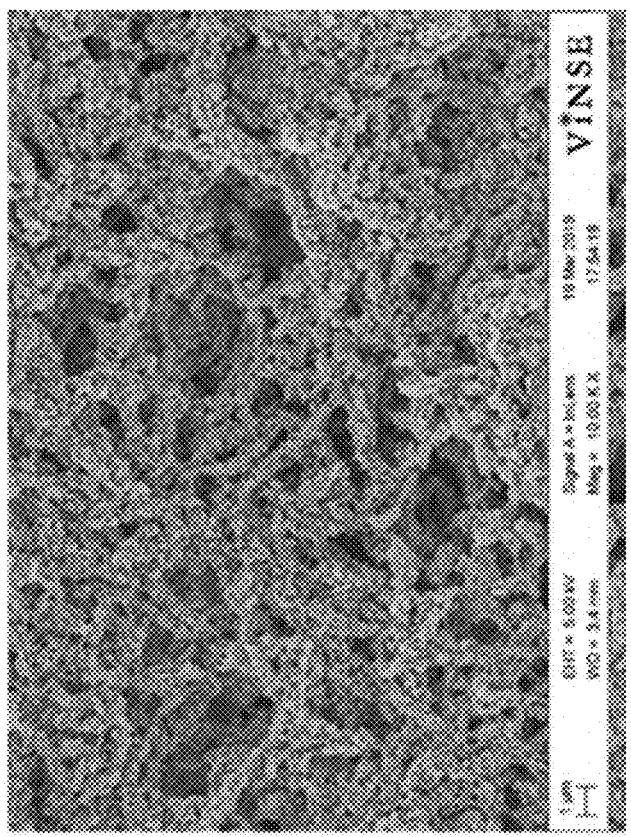
FIGS. 8A-8B show scanning electron micrographs of re-dispersed fiber electrodes at 3 k× magnification (FIG. 8A) and 10 k× magnification (FIG. 8B), according to embodiments of the invention.
Figure 8A:
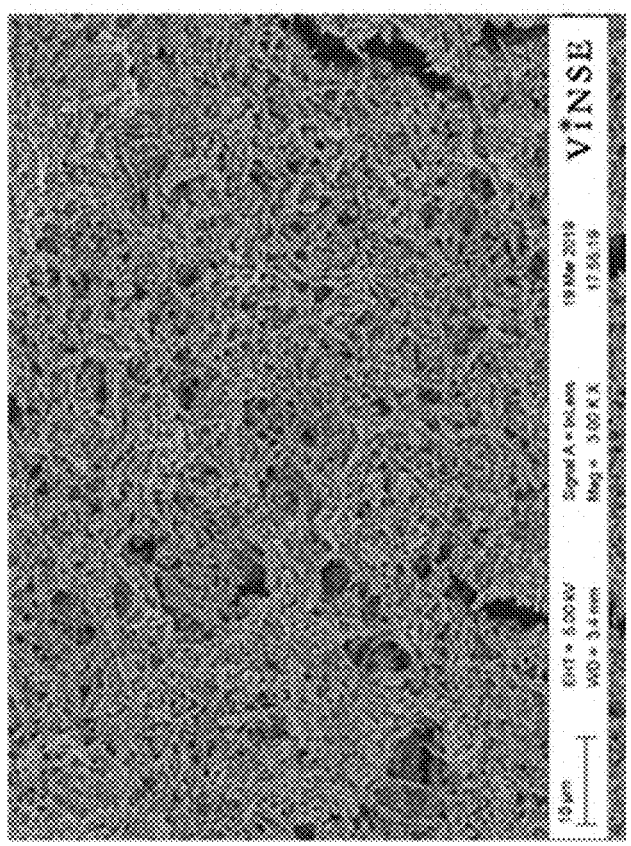

The fiber-based ink can be used to prepare electrodes by spraying, die-slot coating or some other coating method. The ink can be used directly and is amenable to conventional methods of preparing fuel cell electrodes. For sprayed electrodes, the ink was sprayed onto gas diffusion layers until the desired gravimetric catalyst loading was achieved. A sample of the sprayed electrode was collected for SEM imaging. As shown with SEM images of re-dispersed fiber electrodes at 3 k× magnification (FIG. 8A) and 10 k× magnification (FIG. 8B), the fiber morphology has clearly been retained after spraying the fiber-based ink. After drying, the gas diffusion electrodes were hot-pressed onto either side of a proton exchange membrane to create a membrane-electrode-assembly (MEA).

Figure 9:
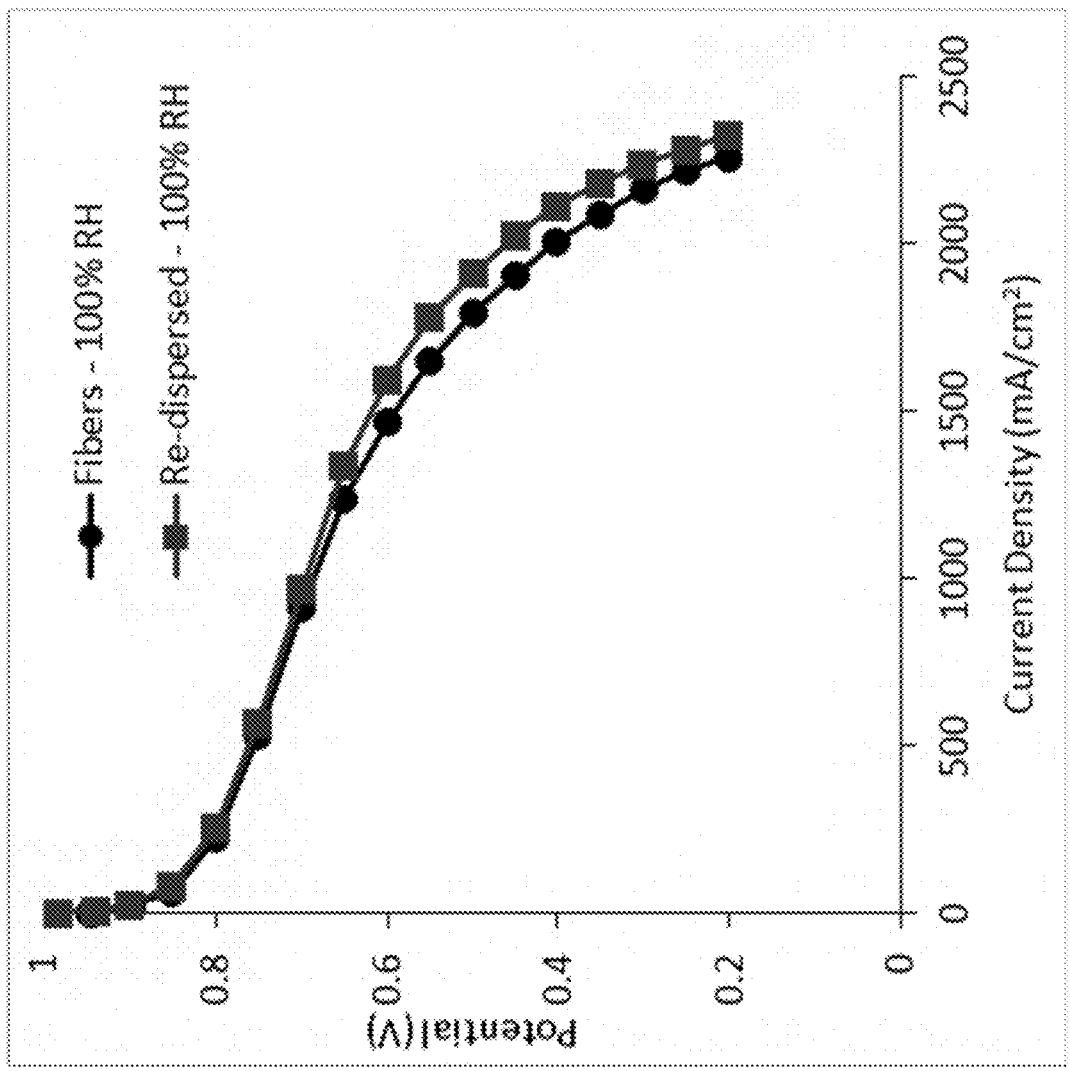
FIG. 9 shows polarization data for as-spun fiber electrodes (black) and re-dispersed fiber electrodes (red) at 100% (filled) and 40% (unfilled) relative humidity, according to embodiments of the invention. Data were collected at 80° C., 200 $kPa_{abs}$, and 125/500 sccm of $H_2$/air at the anode and cathode, respectively.

The MEA was loaded into a fuel cell test stand and Hz/air fuel cell performance was evaluated using procedures described in the literature. Polarization data of the re-dispersed fiber electrodes is contrasted with fiber mat electrodes made by directly electrospinning fibers onto carbon. FIG. 9 illustrates polarization data for as-spun fiber electrodes (black) and re-dispersed fiber electrodes (red) at 100% (filled) and 40% (unfilled) relative humidity. Data were collected at 80° C., 200 kPa$_{abs}$, and 125/500 sccm of $H_2$/air at the anode and cathode, respectively. The data show that at both low and high relative humidity, re-dispersed fiber electrodes (i.e., electrodes made by spraying an ink with fibers) produce similar power as compared to an MEA with as-spun fiber electrodes (no re-dispersion of the fibers).

The foregoing description of the exemplary embodiments of the invention has been presented only for the purposes of illustration and description and is not intended to be exhaustive or to limit the invention to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above are only intended to illustrate the principles of the present invention and are not intended to limit the scope of the invention to the disclosed elements.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in the description of this invention are incorporated herein by reference in their entireties and to the same extent as if each reference was individually incorporated by reference.

What is claimed is:

1. A composite electrode, being a multi-fiber electrode, comprising:
   a membrane/separator or an electrically conductive substrate; and a fiber network coated on the membrane/separator or the electrically conductive substrate with an electrode ink comprising pre-formed fibers and a solvent, wherein the pre-formed fibers are pre-formed before preparation of the electrode ink via a fiber spinning process;

wherein the pre-formed fibers comprise one or more polymers, and one or more particles;

wherein said one or more particles comprise catalyst particles or particles of an electrochemically active material; and wherein the electrochemically active particles comprise silicon (Si) particles, Si nanoparticles, Si nanowires, Si-carbon particles, Si oxide particles, titania particles, and/or precious metal or non-precious metal catalysts particles on conductive or non-conductive supports, wherein the non conductive supports include titania or alumina, and wherein the conductive supports include carbon particles, graphite particles, carbon black particles, carbon nanotubes, carbon fibers, or a mixture thereof.

2. The composite electrode of claim 1, wherein the electrode ink further comprises a polymeric binder dispersed in the solvent.

3. The composite electrode of claim 1, wherein the electrode ink further comprises micellar droplets (particles) of a water-insoluble polymer dispersed in the solvent, wherein the solvent is a water/alcohol solvent.

4. The composite electrode of claim 3, wherein water-insoluble polymer comprises a perfluorosulfonic acid polymer, or a hydrocarbon polymer with negatively or positively charged ion-exchange groups.

5. The composite electrode of claim 1, wherein said one or more particles further comprise micellar polymer droplets.

6. The composite electrode of claim 1, wherein the fiber spinning process comprises electrospinning, centrifugal spinning, or gas jet fiber spinning.

7. The composite electrode of claim 1, wherein the electrode ink is coated on the membrane/separator or the electrically conductive substrate by spray coating, electrospraying, ultrasonic spraying, slot-die coating, gravure coating, doctor-blade coating, or spin coating.

8. The composite electrode of claim 1, wherein the pre-formed fibers in the electrode ink comprise only one fiber.

9. The composite electrode of claim 1, wherein the pre-formed fibers in the electrode ink comprise two or more different types of fibers, wherein each type of the fibers differs in the type/amount of particles, and/or the type/amount of a polymer binder, and/or the fiber morphology including fiber diameter and internal fiber porosity.

10. The composite electrode of claim 1, being a layered electrode structure having multiple layers of composite fiber electrodes deposited onto one another.

11. The composite electrode of claim 1, being a layered or gradient-composition electrode structure formed by coating multiple different fiber-containing inks onto one another sequentially.

12. The composite electrode of claim 11, wherein each of said multiple different fiber-containing inks differs in fiber type/structure including fiber diameter and porosity, fiber composition, and binder type and amount.

13. The composite electrode of claim 11, wherein thickness and porosity of each layer are fixed or variable.

14. The composite electrode of claim 1, wherein the pre-formed fibers in the electrode ink comprise electrospun Si/PAA fibers.

15. The composite electrode of claim 14, wherein a Si:PAA ratio of the electrospun Si/PAA fibers is 60:40 wt. %.

16. The composite electrode of claim 15, having 20 wt. % carbon, 45 wt. % silicon, 35 wt. % binder.

17. The composite electrode of claim 1, wherein the pre-formed fibers in the electrode ink comprise electrospun Si/PAA fibers, and electrospun C/PAN fibers.

18. The composite electrode of claim 17, wherein a ratio of the electrospun Si/PAA fibers to the electrospun C/PAN fibers is 70:30 wt. %.

19. The composite electrode of claim 18, wherein a Si:PPA ratio of the electrospun Si/PAA fibers is 50:50 wt. %, and a C:PAN ratio of the electrospun C/PAN fibers is 63:37 wt. %.

20. The composite electrode of claim 1, wherein the one or more polymers comprise polyacrylic acid (PAA), polyamide-imide (PAI), polyvinylidene fluoride (PVDF), polyacrylonitrile (PAN), and/or polyethylene oxide (PEO).

21. An electrochemical device, comprising at least the composite electrode of claim 1.

* * * * *